United States Patent [19]

Hackleman

[11] Patent Number: 5,640,183
[45] Date of Patent: Jun. 17, 1997

[54] REDUNDANT NOZZLE DOT MATRIX PRINTHEADS AND METHOD OF USE

[75] Inventor: David E. Hackleman, Monmouth, Oreg.

[73] Assignee: Hewlett-Packard Company, Palo Alto, Calif.

[21] Appl. No.: 277,723

[22] Filed: Jul. 20, 1994

[51] Int. Cl.$^6$ ................................................ B41J 2/145
[52] U.S. Cl. .................................. 347/40; 347/47
[58] Field of Search ........................ 347/40, 47, 19, 347/12, 41

[56] References Cited

U.S. PATENT DOCUMENTS

| 4,215,350 | 7/1980 | Mielke et al. | 346/75 |
|---|---|---|---|
| 4,750,009 | 6/1988 | Yoshimura | 347/43 |
| 4,791,437 | 12/1988 | Accattino et al. | 346/140 |
| 4,905,017 | 2/1990 | Sugitani et al. | 346/16 |
| 4,963,882 | 10/1990 | Hickman | 346/1.1 |
| 4,989,016 | 1/1991 | Gatten et al. | 347/9 |
| 5,124,720 | 6/1992 | Schantz | 347/19 |
| 5,398,053 | 3/1995 | Hirosawa et al. | 347/13 |
| 5,483,268 | 1/1996 | Fujimoto | 347/37 |

FOREIGN PATENT DOCUMENTS

| 60-104338 | 6/1985 | Japan | 347/47 |
|---|---|---|---|

OTHER PUBLICATIONS

Anonymous, "'Redundant' Dot Technique Improves Quality and Reliability of Drop on Demand Inkjet Printing" RD31434, Jun. 1990.

Primary Examiner—Benjamin R. Fuller
Assistant Examiner—Craig A. Hallacher

[57] ABSTRACT

A method and apparatus for ink-jet printing provides a redundancy strategy. A number of drop generators within the printhead is added to the standard array, providing redundant orifices in the nozzle plate at the ends of each column of orifices. In operation, the printhead is shifted regularly or pseudo-randomly such that a different set of nozzles prints adjacent swaths or pixels of a swath in multi-pass or multi-dot per pixel printing.

7 Claims, 4 Drawing Sheets

REDUNDANT NOZZLE DOT MATRIX PRINTHEADS AND METHOD OF USE

BACKGROUND OF THE INVENTION

1. Field of the Invention

The present invention relates generally to ink-jet technology, more particularly to printheads for ink-jet pens, and, more specifically, to an ink-jet printhead with redundant nozzles and a method of use.

2. Description of the Related Art

The art of ink-jet technology is relatively well developed. Commercial products such as computer printers, graphics plotters, and facsimile machines, employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994) editions, incorporated herein by reference.

In ink-jet pen technology prior art, as generally depicted in FIGS. 1 and 2, it is known to provide a pen body 10 having an ink reservoir section 12 containing a supply of ink (not shown). The pen 10 includes a snout 25 with a printhead 14. The printhead 14 includes an orifice plate 18, having a nozzle array 16 with nozzles 17 aligned in combination with subjacent heating elements. Windows 22, 24 in the orifice plate 18 facilitate mounting of the printhead 14.

As depicted in FIG. 3, each nozzle region is a drop generator device which includes a heating element, resistor 304, a firing chamber 306 where nucleation and bubble growth takes place, and the nozzle 302 itself through which the ink droplet is fired at the medium.

In operation, ink is fed from the reservoir to the drop generators (ARROW A). The printhead 10 is coupled to printer control circuitry (not shown) by contact pads 20 of a flex circuit coupling the drop generators to the printer controls. Thermal excitation of ink (also sometimes referred to as dye or colorant) from the reservoir at the drop generators is used to eject droplets through the tiny nozzles 17 onto an adjacent print medium in a dot matrix configuration. The pen 10 is generally held in a carriage and scanned bidirectionally across the print medium, firing the ink droplets as it scans. The orifice array 16 is arranged to be selectively activated via the flex circuit 20 to fire simultaneously or in rapid succession during scanning to create a swath of small droplets on the medium in order to print characters or images.

The orifice plate and nozzle array configuration is one of the main ink-jet apparatus design factors that controls droplet size, velocity and trajectory of the droplets. In the state of the art, it is known to print one-third inch swaths at a six-hundred dot-per-inch ("DPI") density, making ink-jet capable of approaching electrophotographic quality. It is believed that 1200 DPI can be achieved with today's technology. This is accomplished in state of the art ink-jet printers by using thin film and semiconductor fabrication technologies to develop printheads with orifice arrays having over hundreds orifices with orifice spacing based upon the print density to be achieved. The larger the nozzle array, the more difficult the design challenges to ensure print quality.

As will be recognized by a person skilled in the art the present invention is applicable to a variety of other pen designs.

In order to accomplish high quality print results, different strategies can be employed for the deposition of ink droplets on the media. That is, print quality, particularly text, is improved by increasing the effective resolution of an image and selectively placing or deleting ink dots to improve the overall smoothness of the character.

Exemplary methods are discussed in U.S. Pat. No. 4,1663,882 (Hickman, commonly assigned to the assignee of the present invention) filed on Dec. 27, 1988, for Printing of Pixel Locations by an Ink Jet Printer Using Multiple Nozzles for Each Pixel or Pixel Row (incorporated herein by reference in its entirety). Dot-On-Dot ("DOD") and Double-Dot-Always ("DDA") techniques are disclosed for printing multiple ink dots on a single pixel from either the same nozzle, or from two different nozzles of a given array in order to compensate for improperly operating or inoperable nozzles. As stated beginning at col. 2, line 16: "In one strategy, each dot is formed from at least two droplets of each color, from different nozzles .... In another strategy, dots that require the same colors in a single pixel row are formed using droplets from different nozzles, so that the degradation in image quality due to a failed nozzle is significantly reduced." In other words, Hickman uses multiple combinations of nozzles of a standard array.

With increasing print speed and nozzle density, there is a continuing need for technology which will enhance ink-jet print quality.

SUMMARY OF THE INVENTION

In its basic aspects, the present invention includes a printhead in which redundant nozzles are provided. That is, a printhead for an ink-jet hard copy apparatus, connected to a supply of ink, includes a nozzle plate, connected to receive ink from said supply of ink, having at least one column of ink-jet orifices, having one orifice in each column for each pixel to be inked in a swath printed from said printhead, and at least one redundant orifice in each said column of orifices.

In operation, the nozzles selected for printing a particular swath are pseudo-randomly or non-randomly shifted for the next swath or for a second pass over the same swath to compensate for misfiring or non-functional nozzles.

It is an advantage of the present invention that it reduces the defects in a dot matrix image caused by a misfiring or non-functional printhead drop generator element.

It is an advantage of the present invention that it is directly implemented within the state of the art technology.

It is an advantage of the present invention that it enhances ink-jet print quality.

It is another advantage of the present invention that it minimizes the effects of defective nozzles on print quality.

It is still another advantage of the present invention that it enables a longer useful lifespan for a replaceable ink-jet pen, resulting in an reduced cost to the end user in that the pen compensates for nozzles which may wear out prematurely.

Other objects, features and advantages of the present invention will become apparent upon consideration of the following detailed description and the accompanying drawings, in which like reference designations represent like features throughout the FIGURES.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. The embodiment described is of necessity an exemplary embodiment as design parameters can be changed to fit the apparatus or printing need. No limitation is intended by the use of exemplary embodiment features, such as the number of nozzles in an array or the swath width printed by a certain array. The invention as claimed can be adapted to many implementations.

Figure 1:
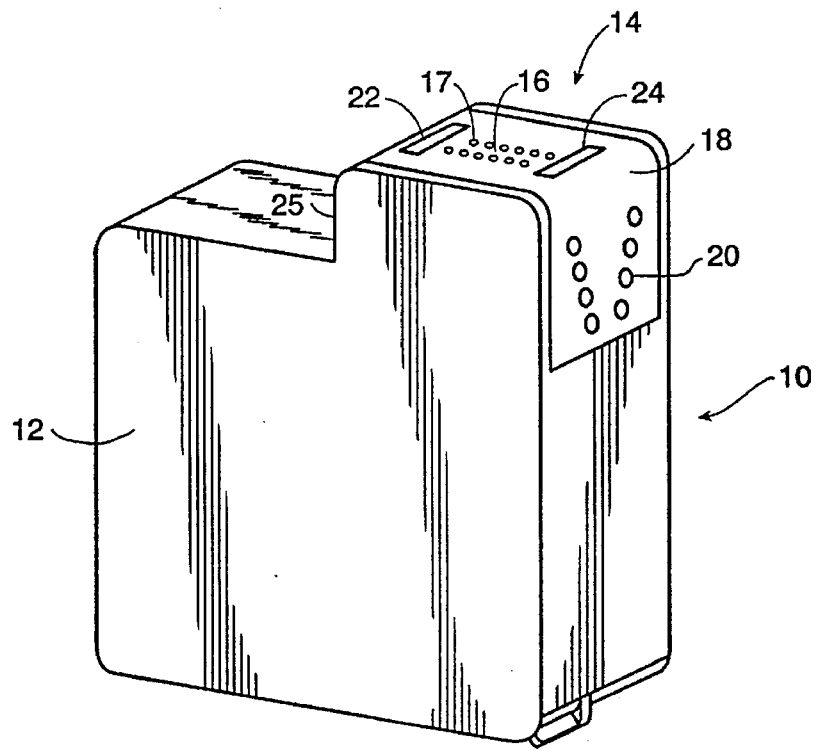
FIG. 1 (Prior Art) is a schematic, perspective drawing of an ink-jet pen.
Figure 2:
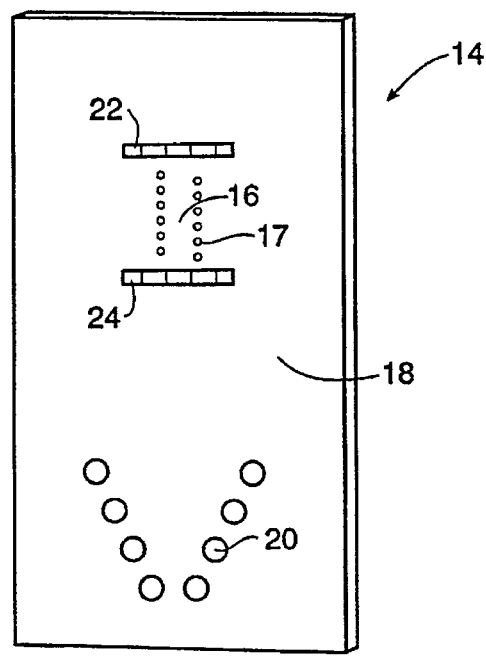
FIG. 2 (Prior Art) is a schematic, plan view (front) drawing of an orifice plate of the ink-jet pen with of FIG. 1.
Figure 3:
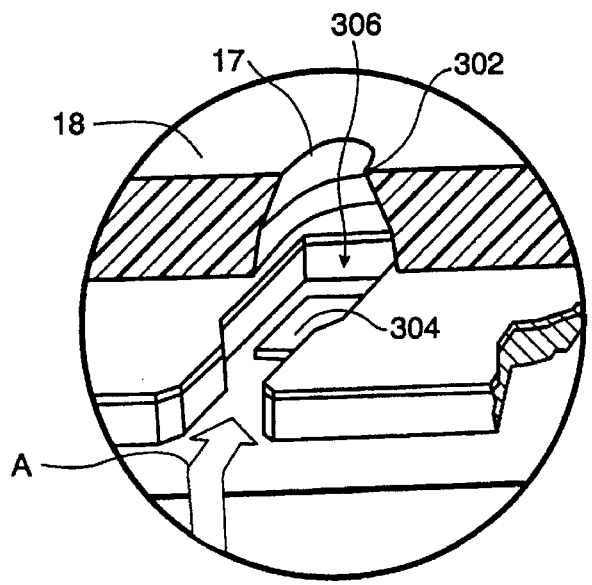
FIG. 3 (Prior Art) is a cutaway, magnified schematic of a single ink-jet drop generator.
Figure 4:
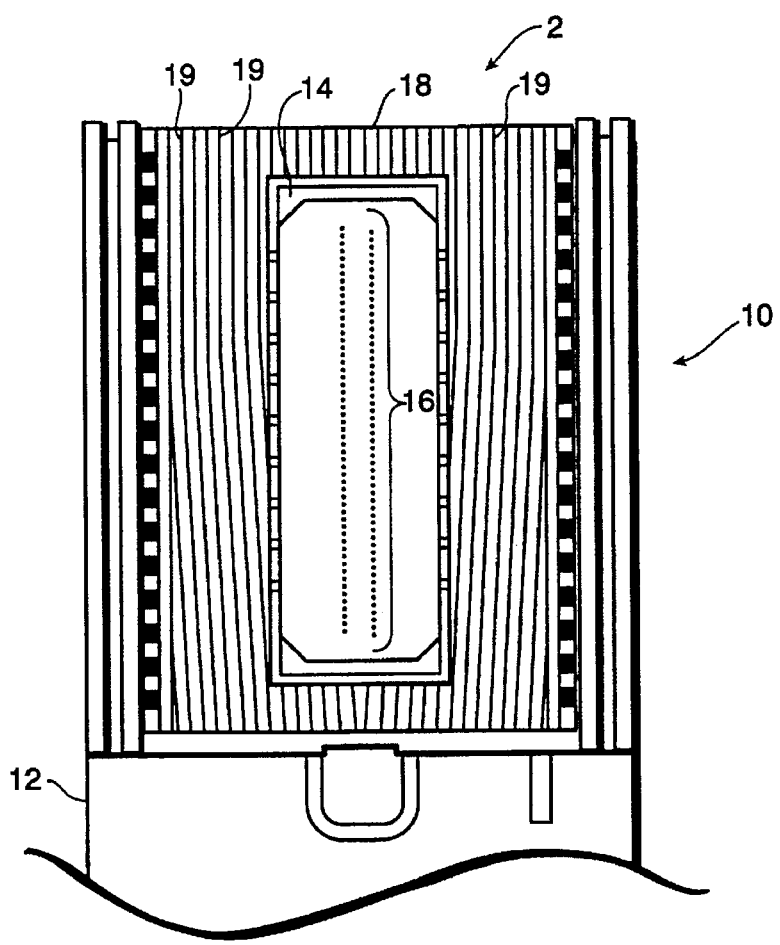
FIG. 4 is a perspective view of the present invention.

Referring now to FIG. 4, an ink-jet pen 10 is shown. As in the prior art, an ink supply is contained in a pen body 12. A flex circuit 18, having traces 19, is used to electrically connect the pen 10 to a controller within the hard copy machine electronics (not shown). A printhead 14 includes an nozzle array 16.

In a 110-nozzle pen designed to print a 600 DPI, approximately one-third inch swath, a two-column array as shown in FIG. 4 has nozzles 17 spaced at 1/300th-inch in each column and staggered a half-space (1/600th-inch) with fifty-five nozzles per column.

Figure 5:
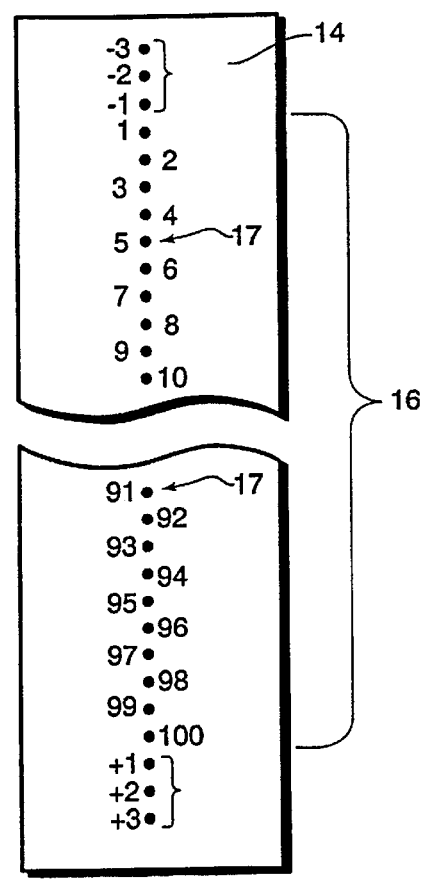
FIG. 5 is a schematic, plan view (front) drawing of an orifice plate in accordance with the present invention as shown in FIG. 4.

For simplification of explanation, the present invention will be described with respect to a single column printhead as shown in FIG. 5. As will be clear to a person skilled in the art, however, the same concepts apply to printheads having adjacent columns of nozzles such as shown in FIG. 4.

If a one-third inch swath is to be printed at 300 DPI, a total of one-hundred nozzles (numbered 1–100) is required. In this exemplary embodiment of the present invention, six additional nozzles are provided at each end of the standard one-hundred nozzle array 16, labelled −1, −2, and −3 and +1, +2, and +3, respectively. The invention can be used in a single droplet per pixel printing mode or, as in the Hickman patent strategies, multiple droplets per pixel can be deposited on the print medium.

The degree of redundancy afforded is dependent upon the number of additional nozzles provided. For example, with six extra nozzles, three at each end of the column as shown in FIG. 5, a seven-dot-row randomization factor is provided.

In its basic aspect, the printhead 14 with redundant drop generators is used to cancel out the effect of an inoperative nozzle. By randomizing the selection of adjacent one hundred nozzles used to fire droplets onto the medium for each swath, the effect on the print of an inoperative nozzle is minimized. Likewise, in a printing mode where, for example, each pixel is double-dotted (as described by Hickman) in multiple passes over the same swath, by changing the selection of the adjacent one hundred nozzles used to print the swath, the pixel left un-dotted on the first pass, now being the target pixel of a different nozzle, will receive at least one droplet of ink.

For example, in a first pass across a print medium, assume that nozzles 1–100 are selectively activated to print a dot matrix in accordance with the instructions from the printer controller. To print the next swath, or to print the second dot in the dotted pixels in a multiple dotting print mode, a different set of one-hundred nozzles is selected, e.g. nozzles −2 through 98; next pass, nozzles 3 through +3 might be selected. That is, in any pass, any set:
1through 100,
−3 through 97,
−2 through 98,
−1 through 99,
2 through +1,
3 through +2, or
4 through +3
may be selected to print.

If the system uses two different nozzles to deposit the droplets on each pixel from the same printhead, such as with the Hickman strategy, then a degree of "redundancy" is afforded in that only under the conditions that both nozzles selected for the particular pixel are not functioning properly will the system fail to deposit a droplet of ink on the designated pixel. The present invention, by utilizing not only a double-dot always strategy but also randomizing the selected nozzles in each pass, virtually eliminates the likelihood of a target pixel not receiving at least one droplet of ink as the potential selection of two non-functional nozzles is much smaller. In fact, the only time when a periodic failure would be detected would be when the number of failures exceeded the random sampling criteria's redundancy factor.

It has been found in practice that there is a limit to the number of nozzles one would want to add just for the reduction of print defects in a single edge pen (one nozzle column, printing unidirectionally). For example, if one were to have a ⅔-inch pen of 200 nozzles and used 50 at each end for the described redundancy method, the throughput of the system would be considerably less than that possible with a print swath of ⅔-inch because the print speed would be cut to a quarter. This implies an optimum number of extra nozzles in a linear array based upon the reduction of throughput, increase in pen life and yield, and simplicity of printer design. In the preferred embodiment, an addition of eight nozzles per column appears optimum. Under this configuration, the likelihood of a failure due to a single missing nozzle is reduced to very close to zero, estimated a 1 per $10^9$ print dots.

Figure 6:
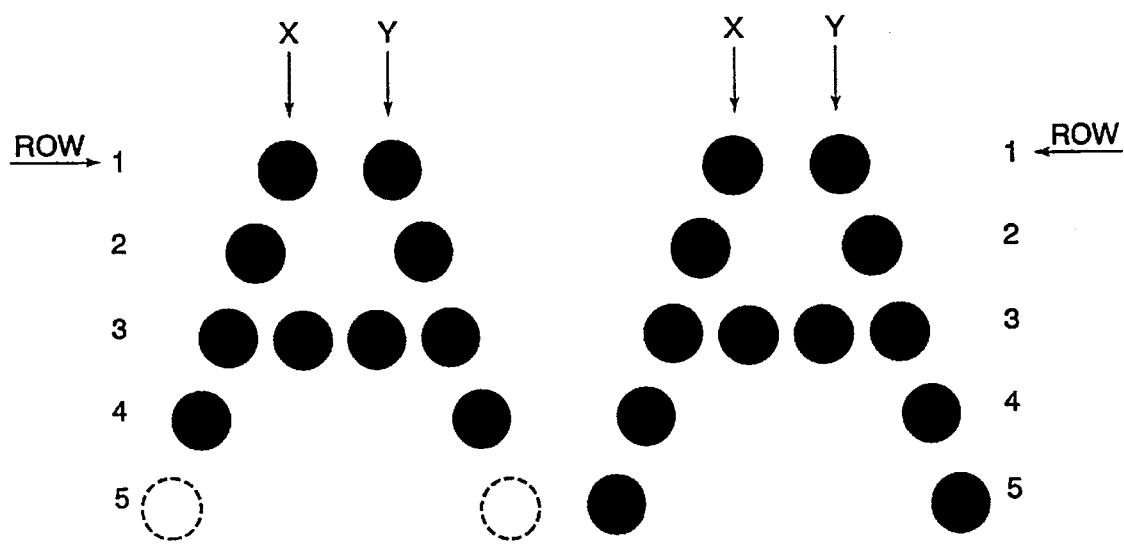
FIG. 6 is an example of printing in accordance with the present invention as shown in FIGS. 4 and 5.

For example, as shown in FIG. 6 (obviously exaggerated from an actual density of 300 dpi to illustrate the point), if it is desired to print the letter "A" using a DDA scheme. On the first pass, row nozzles one through five were selected, however, nozzle number 5 is non-functional. A memory retains knowledge of all of the dots intended to be printed in the swath and their locations. On the return scan, in accordance with the present invention row nozzles minus one through 3 were selected. Those nozzles now print on the same locations. Thus, while only receiving a single droplet of ink, nonetheless, the bottom dots of the "A" are now filled.

Figure 7:
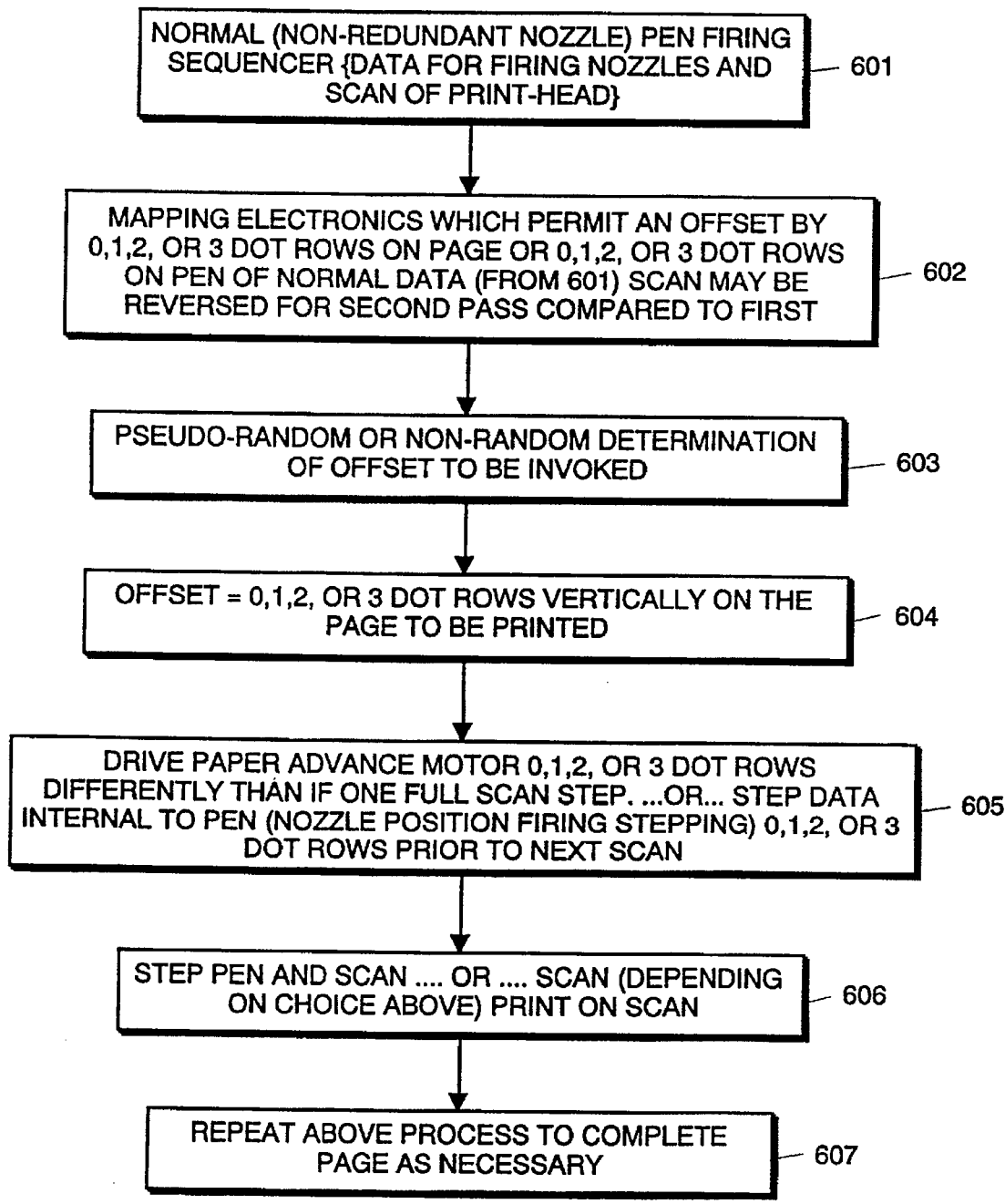
FIG. 7 is an exemplary drive method for the present invention as shown in FIG. 5.

A general method of operation is described with respect to FIG. 7. In fact, as would be recognized by a person skilled in the art, there are innumerable methods to drive a pen in an ink-jet printer to cause the firing of droplets at the proper locations on a print medium to achieve legible printing and plotting.

Beginning with a normal pen firing sequence routine 601 such as the DDA schemes referenced above. The data can then be electronically mapped 602. That is, determinations can be made whether to print the swath of data normally (i.e., 0 offset) or to have an offset by "n" dots. Note that the pen nozzles can be offset as described above, or the data itself can be shifted from the normal set of nozzles to one of the offset sets of nozzles. Note also that printing may occur in either unidirectional or bidirectional scanning of the printhead across the page.

In order to minimize the effect that any defective nozzle may have on the printed image, the offset for each swath is decided upon 603. The methodology for offset selection may be non-random, e.g., offset=0, 1, 2, 3, 0, 1, 2, 3, 0, 1 . . . , or pseudo-randomly selected.

Once the offset is chosen for a particular swath 604 (or first scan of a bidirectionally printed swath), either 605 the paper drive is stepped accordingly, that is a normal swath step plus or minus the offset selected, or the data is offset prior to the next scan.

Finally, the swath is printed 606 in accordance with the choice selected. The process then repeats 607 to complete the page as necessary.

As will be known to a person skilled in the art, the methodology of the present invention can be implemented in a variety of hardware devices, such as by the use of shift register memory or more sophisticated microprocessor designs.

Moreover, it will be recognized that the methodology disclosed is adaptable to any form of dot matrix printing.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method of making hard copy using an ink-jet apparatus, having a printhead with a nozzle means, connected to receive ink from an ink supply, for ejecting ink from said printhead onto a print medium, said nozzle means having an orifice plate with at least one column of "n" number of orifices, where "n" is an integer greater than one constituting one orifice in each column for each pixel in a plurality of rows of pixels equal in number to said orifices in said columns to be inked in a swath printed from said printhead, and having "n+m" number of additional orifices in each said column, where "m" is an integer greater than or equal to one, said method comprising:

a. selecting, between the first orifice of each said column to the n+m$^{th}$ orifice of each said column, a first contiguous set of "n" orifices;

b. inking a first swath of rows of pixels on said medium using said first contiguous set of "n" orifices from each said column;

c. shifting said printhead to select randomly a second contiguous set of "n" orifices between the top orifice of each said column and the n+m$^{th}$ orifice of each said column; and d. inking a second swath of rows of pixels using said second set of orifices.

2. The method as set forth in claim 1, wherein said step of inking a second swath comprises:

overlaying printed dots of said first swath.

3. The method as set forth in claim 1, wherein said step of inking said second swath comprises:

re-dotting each pixel of said first swath with droplets of identically colored ink from said second set of orifices.

4. The method as set forth claim 1, further comprising:

following step c:

e. shifting said printhead the full width of one swath;

f. repeating steps b. and c.; and g. repeating steps e. and f. until all swaths of said hard copy is completed.

5. A method of making hard copy using an ink-jet apparatus, having a printhead with a nozzle means, connected to receive ink from an ink supply, for ejecting ink from said printhead onto a print medium, said nozzle means having an orifice plate with at least one column of "n" number of orifices, where "n" is an integer greater than one constituting one orifice in each column for each pixel in a plurality of rows of pixels equal in number to said orifices in said columns to be inked in a swath printed from said printhead, and having "n+m" number of additional orifices in each said column, where "m" is an integer greater than or equal to one, said method comprising the steps of:

a. selecting, between the first orifice of each said column to the n+m$^{th}$ orifice of each said column, a first contiguous set of "n" orifices;

b. entering data representing the locations of said swath to be inked in a memory;

c. inking according to said data a first swath of rows of pixels on said medium using said first contiguous set of "n" orifices from each said column;

d. shifting said data representing said first swath of rows of pixels to select a second contiguous set of "n" orifices between the first orifice of each said column and the n+m$^{th}$ orifice of each said column; and e. inking said first swath of rows of pixels with said second contiguous set of "n" orifices.

6. The method as set forth in claim 5, further comprising:

following step e.,

F. stepping said printed one full swath width, and

G. repeating steps a. through e.

7. The method as set forth in claim 6, further comprising:

repeating steps F. and G. until all swaths of said hard copy is completed.

* * * * *